Nov. 24, 1964 J. R. ANDERSON 3,158,842

MEMORY DEVICES USING FERROELECTRIC CAPACITORS AND PHOTOCONDUCTORS

Original Filed March 27, 1959

INVENTOR
JOHN R. ANDERSON

BY Louis A Kline
Albert L. Sessler, Jr.
HIS ATTORNEYS

1

3,158,842

MEMORY DEVICES USING FERROELECTRIC CAPACITORS AND PHOTOCONDUCTORS

John R. Anderson, Los Altos, Calif., assignor to The National Cash Register Company, Dayton, Ohio, a corporation of Maryland Original application Mar. 27, 1959, Ser. No. 802,371, now Patent No. 3,079,591, dated Feb. 26, 1963. Divided and this application July 9, 1962, Ser. No. 208,476
3 Claims. (Cl. 340—173.2)

This invention relates to memory devices, and more particularly relates to memory devices employing bistable ferroelectric memory elements.

This application is a division of United States patent application Serial No. 802,371, filed March 27, 1959, now Patent No. 3,079,591.

One of the essential elements of an electronic data processing system is a "memory" or information storage device. Since a large amount of information must commonly be stored in such a system, the cost per "bit" or element of information stored becomes of great importance. Bistable ferroelectric materials show promise for use in the storage of information because of the possibility of using such materials in connection with plating, printing, depositing, or similar techniques to fabricate packaged memory units at relatively low cost.

In the memory device of the present invention, a matrix of ferroelectric elements is provided either in the form of a plurality of individual elements or in the form of a plurality of effectively individual elemental volumes in a block of ferroelectric material. Photoconductively operated access means are provided for the ferroelectric elements, and electroluminescent means are utilized for output purposes. It will be seen that a memory or storage device consisting entirely of solid state elements has thus been devised, the design of which lends itself admirably to the simple and inexpensive fabrication techniques previously discussed.

Since ferroelectric materials have rectangular hysteresis characteristics, in which there are two remanent conditions of electrical charge (Q) or polarization, in which ferroelectric elements exhibit substantial charge saturation, these elements are bistable and therefore well suited for storage of information. The use of ferroelectric elements in storage matrices is known, as shown, for example, in the United States patent to John R. Anderson, No. 2,695,398, issued November 23, 1954. However, the above patent did not contemplate the use of ferroelectric elements in combination with photoconductive cells in the manner disclosed herein to provide a memory device of extremely simple yet efficient design.

A number of important advantages are achieved by the present invention. For one, complete isolation is obtained between each of the ferroelectric elements in the matrix memory. That is, no disturbing voltage will appear across unselected elements, since these essentially are in series with an open circuit. One of the past difficulties with ferroelectric matrix memories has been that individual cells would eventually walk up their hysteresis loop when subjected to long series of disturbing pulses. This fault is eliminated with this arrangement. Also, close control of storing and reading voltage amplitudes is unnecessary, since selection is no longer by coincident voltage. In addition, the connecting lead wires to the ferroelectric memory matrices can be reduced to only two instead of 2N for a matrix containing N by N elements. This greatly reduces fabrication costs and allows for closer spacing of ferroelectric storage elements. Yet another advantage is that optical techniques can be used for access, thus greatly reducing the total cost of access circuitry. For example, sequential access can be provided with one or more simple rotating disks with a single light on them impinging on successive rows and columns. Access can also be obtained by electroluminescent matrix arrays, if desired.

2

It is accordingly an object of this invention to provide a simple and effective memory device.

Another object is to provide a matrix memory using storage elements of ferroelectric materials which have bistable characteristics.

Another object is to provide a matrix memory utilizing a combination of ferroelectric, photoconductive, and electroluminescent elements.

An additional object is to provide a matrix memory capable of being fabricated by simple and inexpensive techniques.

A further object is to provide a memory device in which electrodes are plated or otherwise deposited upon opposite sides of a block of ferroelectric material in such manner as to provide a plurality of effective individual elemental volumes of ferroelectric material at intersections of the electrodes.

Yet another object is to provide a memory device which utilizes a combination of ferroelectric and photoconductive elements.

With these and incidental objects in view, the invention includes certain novel features of construction and combinations of parts, a preferred form or embodiment of which is hereinafter described with reference to the drawing which accompanies and forms a part of this specification.

Figure 2:
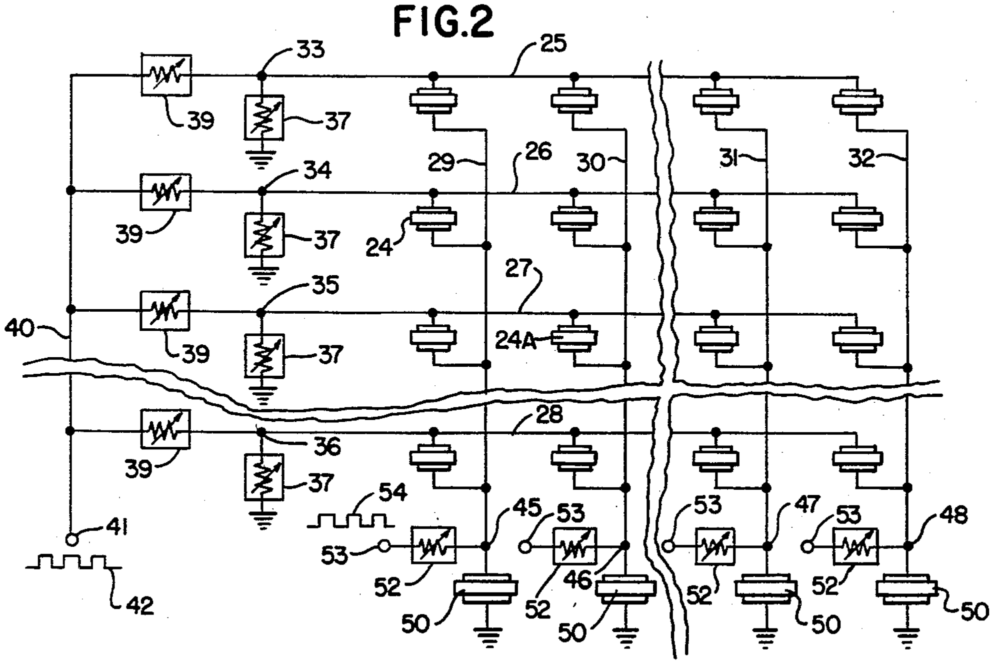
FIG. 2 is a diagram of a matrix memory circuit constructed in accordance with this invention, and utilizing electroluminescent output means and photoconductive input means.

The ferroelectric elements utilized in the matrix memory of FIG. 2 are shown there in the form of capacitors, with a ferroelectric material, such as barium titanate, forming the dielectric.

Barium titanate is one of a group of materials, commonly termed "ferroelectrics," which have substantially rectangular hysteresis loops. A hysteresis loop for barium titanate crystals of the type used in the present invention is illustrated in FIG. 1, where the vertical axis represents electrical displacement or degree of polarization and the horizontal axis represents the voltage applied across the terminals of the ferroelectric elements, this voltage bearing a proportional relation to the electrical field strength.

Figure 1:
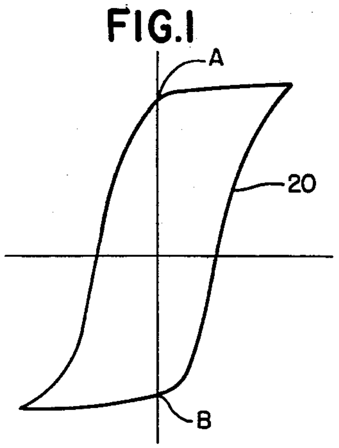
FIG. 1 is a graph showing a hysteresis loop for a ferroelectric element of the type utilized in the devices of FIGS. 2 and 3.

Points A and B on the loop 20 of FIG. 1 represent stable states of polarization, and the ferroelectric element, when placed in either of these states by application of the required electrical field across the terminals thereof, will remain in such state for a considerable period of time with all external fields removed.

All of the ferroelectric elements in a matrix memory are customarily polarized in one direction before use of the memory is commenced. Information may then be stored in the individual elements of the memory by applying voltages to the electrodes of the selected element to reverse its direction of polarization. Information which has been stored in any individual element of a matrix may be read out by applying voltages to the electrodes of said element to restore the initial direction polarization of the ferroelectric material making up the dielectric portion of the element. This reversal of polarization will produce an output signal from the element which may be detected to determine which of the two stable states the element is in. If no information has been stored in the element, a voltage readout pulse on the electrodes of such an element will not reverse its polarization and will therefore not produce an output pulse. It is thus seen that binary information may be stored in any individual element of the matrix memory and may be read out by application of the proper signal to the selected element.

A matrix memory of the form shown in FIG. 2 may contain any desired number of ferroelectric elements, or effective ferroelectric elemental volumes in a block or slab of ferroelectric material, but is shown containing a total of sixteen ferroelectric elements arranged in four rows and four columns. Although the ferroelectric components of the matrix memory circuit of FIG. 2 may consist either of individual ferroelectric elements, or of effectively individual elemental volumes defined by the intersection of two electrodes on opposite sides of a block or slab of ferroelectric material, for the sake of simplicity in description, these components will hereinafter be referred to as "ferroelectric elements."

Referring to FIG. 2, four horizontal rows are defined by a plurality of commons 25, 25, 27, 28, and the four vertical columns are defined by a plurality of commons 29, 30, 31, 32. A ferroelectric element, indicated by the reference character 24, is disposed at each intersection of the commons. A first path extends from points 33, 34, 35, and 36 on the commons 25 to 28, respectively, through a photoconductive cell 37 to a terminal connected to a base reference potential, shown here as ground. A second path extends from each of the points 33 to 36 inclusive through a photoconductive cell 39 to a common 40 connected to a terminal 41, to which an electrical signal having a wave form such as that shown at 42 may be applied.

Points 45, 46, 47, and 48 on the commons 29, 30, 31, and 32, respectively, are each connected over a first path through an electroluminescent element 50 to a terminal connected to a base reference potential, shown in FIG. 2 as ground. The points 45 to 48 inclusive are also each connected over a second path through a photoconductive cell 52 to a terminal 53, to which an electrical signal having a wave form such as that shown at 54 may be applied.

The manner in which the matrix memory of FIG. 2 functions to store and to read out information will now be described. For the storage, or "writing," of information in the matrix, a train of pulses (positive pulses, such as shown in wave form 54, will be used for purposes of illustration herein) is applied to the terminals 53, and the desired ferroelectric element is selected by applying an optical pulse to the photoconductive cell 37 on the horizontal common with which the selected ferroelectric element is associated, and simultaneously applying an optical pulse to the photoconductive cell 52 on the vertical common with which the selected ferroelectric element is associated.

As is well known, photoconductive materials possess the property of changing their electrical resistance in response to changes in radiation of certain wave lengths which impinge on them. One material frequently used for photoconductive cells of the type shown herein is cadmium sulfide, which has a high electrical resistance when not illuminated by radiation of suitable wave lengths, and which has a relatively low resistance when it is so illuminated. The photoconductive cells 37, 39, and 52 of the matrix memory of FIG. 2 therefore act as switches which are open when the cells are dark and which are closed when the cells are illuminated.

Any suitable source may be used for applying radiation to the photoconductive cells. For example, electroluminescent elements or neon glow tubes, operated in timed relation to the signals applied to the terminals 53, may be used.

It will be seen that by selectively applying an optical pulse to the photoconductive cell 37 of a selected one of the horizontal commons, and by simultaneously applying an optical pulse to the photoconductive cell 52 of a selected one of the vertical columns, a circuit is in effect completed through one of the ferroelectric elements 24. For example, assuming that the ferroelectric element associated with the commons 27 and 30 is selected, a circuit is completed from the terminal 53 over an illuminated photoconductive cell 52, the point 46, the common 30, the selected ferroelectric element 24A, the common 27, the point 35, and the illuminated photoconductive cell 37 to ground. The selected ferroelectric element 24A is thus switched from a first polarized state, to which it, like all of the other ferroelectric elements in the matrix memory has been initially set by appropriate use of the input means, to a second polarized state, in which it is polarized in the opposite direction. Binary information is thus stored in the element 24A. Circuits through the remaining elements 24 are blocked because one or both of the associated commons are connected to a photoconductive cell 37 or 52 in a high-resistance state, which effectively acts as an open switch.

Reading out of information stored in the matrix memory is accomplished in the following manner. A train of pulses (in the illustrated embodient, positive pulses such as shown in the wave form 42) is applied to the terminal 41 of FIG. 2. Simultaneously, the photoconductive cell 39 associated with the horizontal row which it is desired to read out is illuminated by an optical pulse. This in effect completes the circuit from the terminal 41 over the common 40 and the photoconductive cell 39 of the selected row to the common related to the horizontal row which it is desired to read out. Pulses from the terminal 41 are thus applied to the ferroelectric elements 24 of the selected row, said pulses being applied to the ferroelectric elements in a direction opposite to the direction of application of the "writing" pulses. Application of these pulses is effective to reverse the polarization of any ferroelectric elements 24 whose polarization has been changed from the initial state of the memory to an information-storing state by "writing" or storage pulses. At the same time, the pulses from the terminal 41 will not affect the direction of polarization of the ferroelectric elements 24 in which no information has been stored. Reversal of polarization of any ferroelectric elements 24 in which information has been stored by a "writing" pulse produces a pulse on the vertical common associated with the element 24. This pulse is transmitted from the common through an electroluminescent element 50 to ground. The electroluminescent element 50, which is fabricated from a suitable electroluminescent material such as a zinc sulfide copper-halide-activated type of phosphor, is caused to glow, or emit rediation, when excited by a change in potential gradient thereacross. A detectable output means is thus provided for each vertical column of ferroelectric elements 24, so that it is possible to determine which ferroelectric elements in each row of the matrix memory have had information stored therein. With the arrangement shown in FIG. 2, it will be seen that readout of all the ferroelectric elements of a selected horizontal row takes place simultaneously when the readout pulses 42 are applied to the terminal 41.

If desired, the electroluminescent elements 50 may be used to control photoconductive cells, either in additional matrices or in other logical or output circuitry. Alternatively, the electroluminescent elements of the matrix memory of FIG. 2 may be used to provide visible indication of the information which has been stored in the memory. It is thus seen that the matrix memory of FIG. 2 provides a simple, effective, solid state device in which access and output circuitry may be electrically isolated from other components in the data-processing system.

Figure 3:
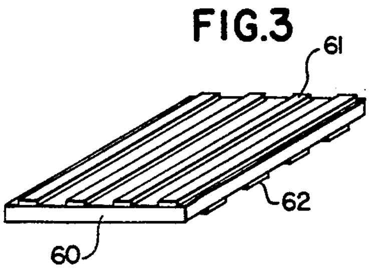
FIG. 3 is a perspective view showing one form in which electrodes may be placed upon a block of ferroelectric material to form a plurality of individual effective ferroelectric volumes for use in a matrix memory.

One possible physical arrangement of components used to form the ferroelectric matrix of FIG. 2 is shown in FIG. 3. A block or slab 60 of some suitable ferroelectric material, such as barium titanate, is provided on one side with a plurality of spaced-apart parallel elongated electrodes 61, and is provided on an opposite side with a similar plurality of parallel elongated spaced-apart electrodes 62, which are oriented transversely, here shown as at right angles, to the plurality of electrodes 61. Application of an electrical signal to a circuit which includes the electrodes 61 and 62 establishes an electrical field through the ferroelectric material at the area of intersection of the selected electrodes 61 and 62. As is well known, a field of sufficient strength through the ferroelectric material in the volume of the intersection between the selected electrodes 61 and 62 causes this elemental volume to be polarized in a direction according to the type of signal employed. Since ferroelectrics are semi-conducting materials, the electrical field is localized at the intersection, and therefore the ferroelectric material beyond the intersection is not affected. The matrix thus formed may be connected to its access and output circuitry by conventional wiring, by printed circuitry, or the access and output components may be formed either adjacent or on the ferroelectric matrix by depositing techniques such as those discussed above.

Although electroluminescent outputs have been shown as applied to the novel matrix (it will be clear that other outputs, using resistive or other types of circuit elements, may be employed if desired.

In the appended claims, where reference is made to ferroelectric or photoconductive elements, it should be realized that this term is intended to include both individual ferroelectric or photoconductive elements and elemental volumes of a larger ferroelectric or photoconductive block or slab.

While the form of the invention illustrated and described herein is particularly adapted to fulfill the objects aforesaid, it is to be understood that other and further modifications within the scope of the following claims may be made without departing from the spirit of the invention.

What is claimed is:

1. An information storage device comprising, in combination, a pair of terminals; pair of serially connected photoconductive control elements disposed in a first path extending between the pair of terminals; a ferroelectric storage element connected at one side to a point on the first path located between the photoconductive elements; a second path extending from the opposite side of the ferroelectric element to a third terminal through a third photoconductive control element; and a third path extending from the opposite side of the ferroelectric element to a fourth terminal through an electroluminescent output means.

2. An information storage device comprising, in combination, a plurality of ferroelectric elements arranged in rows and columns; a first plurality of commons, each of said commons of said first plurality being connected to all of said ferroelectric elements in a row; a second plurality of commons, each of the commons of said second plurality being connected to all of said ferroelectric elements in a column, said commons being effective to apply electrical fields across the ferroelectric elements to polarize said elements in a given direction for the storage of information therein; a first group of photoconductive elements, each being connected at one side to one of the first plurality of commons; first terminal means connected to the other side of each of the first group of photoconductive elements; a second group of photoconductive elements, each connected at one side to the first plurality of commons; second terminal means connected to the other side of each of the second group of photoconductive elements; a third group of photoconductive elements, each connected at one side to one of the second plurality of commons; third terminal means connected to the other side of each of the third group of photoconductive elements; and output means connected to each of the commons of said second plurality, whereby a circuit path for reading out of information from said storage device may be completed by illumination of a selected photoconductive element of said first group, and whereby a circuit path for storage of information in a selected ferroelectric element of said storage device may be completed by selective illumination of certain of the photoconductive elements of said second group and said third group.

3. An information storage device comprising, in combination, a plurality of ferroelectric elements arranged in rows and columns; a first plurality of commons, each of said commons of said first plurality being connected to all of said ferroelectric elements in a row; a second plurality of commons, each of the commons of said second plurality being connected to all of said ferroelectric elements in a column, said commons being effective to apply electrical fields across the ferroelectric elements to polarize said elements in a given direction for the storage of information therein; a first group of photoconductive elements, each being connected at one side to one of the first plurality of commons; first terminal means connected to the other side of each of the first group of photoconductive elements; a second group of photoconductive elements, each connected at one side to the first plurality of commons; second terminal means connected to the other side of each of the second group of photoconductive elements; a third group of photoconductive elements, each connected at one side to one of the second plurality of commons; third terminal means connected to the other side of each of the third group of photoconductive elements; and output means, including an electroluminescent element, connected to each of the commons of said second plurality, whereby a circuit path for reading out of information from said storage device by means of said electroluminiscent element may be completed by illumination of a selected photoconductive element of said fisrt group, and whereby a circuit path for storage of information in a selected ferroelectric element o fsaid storage device may be completed by selective illumination of certain of the photoconductive elements of said second group and said third group.

No references cited.